Feb. 6, 1940.   H. A. HUSTED   2,189,005
MEANS FOR ANCHORING SPOKES TO STEERING WHEEL HUBS
Filed Aug. 20, 1936
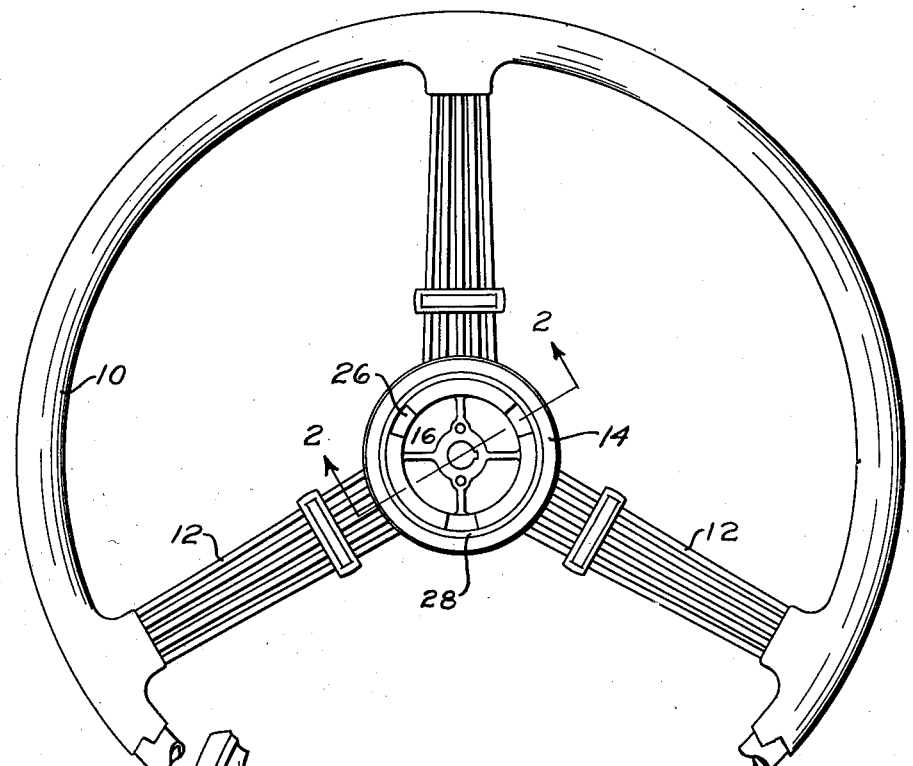
Fig. 1
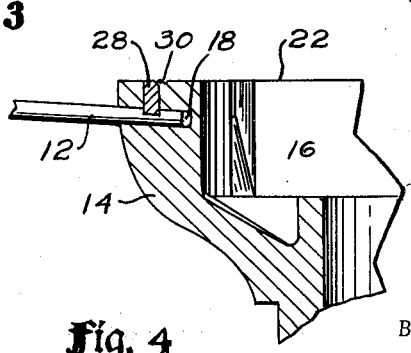
Fig. 3
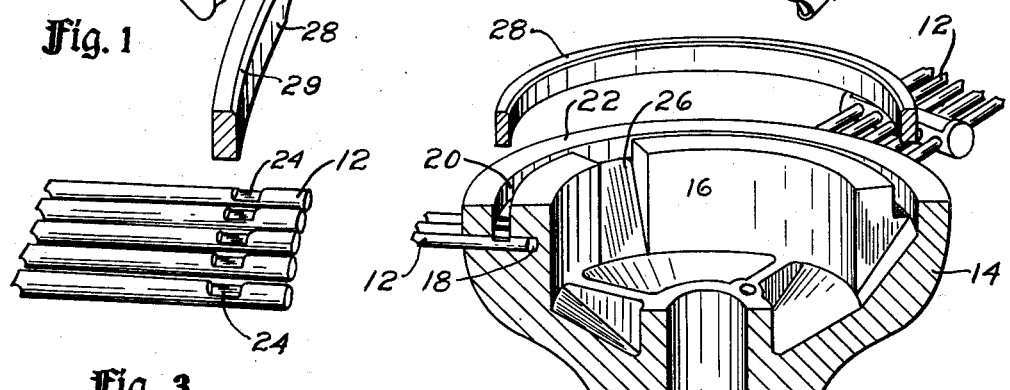
Fig. 4
Fig. 2
INVENTOR.
HARRY A. HUSTED
BY
his ATTORNEY.

Patented Feb. 6, 1940

2,189,005

UNITED STATES PATENT OFFICE 2,189,005

MEANS FOR ANCHORING SPOKES TO STEERING WHEEL HUBS

Harry A. Husted, St. Clair, Mich., assignor, by mesne assignments, to The Standard Products Company, Port Clinton, Ohio, a corporation of Ohio Application August 20, 1936, Serial No. 97,037

6 Claims. (Cl. 74—552)

This invention relates to an improvement in steering wheels of the general type disclosed in my pending application Serial No. 52,158, filed November 29, 1935, and more specifically is directed to a novel method and means for quickly and positively anchoring each of the wire spoke members to the hub.

Prior to this invention I devised several methods of joining these wire spokes to the hub member, all of which are effective as to strength and durability, but compared to the present invention, the cost of these other methods is materially greater.

One method, for example, as disclosed in the above identified application, consists in casting the spokes into the hub. In this construction, the partially assembled steering wheel spiders, which include the rim with spokes attached, had to be transported to the foundry where each such spider was securely held in a suitable jig around the hub mold while the metal for the hub was being poured or injected. The time consumed and the expense involved in transportation and in handling these spiders greatly added to the cost of each wheel.

Furthermore, the surfaces of the spokes of such wheels became discolored from the heat absorbed thereby during the casting of the hub and consequently a polishing operation of the spokes and hub after assembly was required.

To overcome these objections and to reduce the cost of the so-called "banjo type" steering wheel as compared with the cast-in spokes, I provided a construction shown and described in my application Serial No. 97,038, filed August 20, 1936, using a two-piece hub together with spokes having heads or deformed portions formed on the inner ends thereof which are engaged by shoulders on each of the hub members for securing each spoke to the hub assembly. In such a construction, it was found that the cost of forming the head on each spoke member, though providing a more economical steering wheel than those previously provided, nevertheless was a considerable item.

To further reduce the cost, the present invention was conceived. Experiments immediately revealed great reductions in cost and time of manufacture of this type of wheel without sacrificing the strength and durability. The present construction offers a more attractive appearing steering wheel than other designs.

An important object of the present invention, therefore, is to provide a quick, inexpensive, and effective method of anchoring each of the wire spoke members to a unitary hub.

Another important object of the invention resides in the provision of a means for more rigidly and accurately anchoring the spoke members to the hub while permitting reasonable variations in lengths of the spoke members.

Still another object is to provide a steering wheel employing the present invention which, by eliminating the operation of forming heads or deformed portions on the inner ends of the spokes, and also by eliminating the usual polishing operation after assembly, will materially reduce the time and cost of manufacture compared to other wheels of similar appearance.

Other objects will appear from the specification and accompanying drawing.

In the drawing—

Fig. 1 is a fragmentary plan view of a wire spoke or banjo type steering wheel employing the present invention.

Fig. 2 is an enlarged fragmentary sectional perspective view showing the spokes in position and the spoke locking means about to be inserted in place.

Fig. 3 is an enlarged fragmentary sectional perspective view of a group of spoke members which comprise one spoke, and shows the retaining notches in the ends of the spokes and a portion of the retaining ring.

Fig. 4 is a fragmentary radial sectional view showing the engagement of the retaining ring with the spoke and hub members.

Referring to Fig. 1, the rim 10 of a steering wheel is shown having attached thereto a number of wire spoke members 12 arranged in groups, the inner ends of which are secured to a hub member, indicated at 14.

The preferred embodiment of the hub member 14 comprises a unitary die casting which is generally bell-shaped and is provided with a central cylindrical recess indicated at 16.

In the outer face of the hub are a number of radial holes 18, drilled, cored or otherwise formed, which are adapted to receive snugly the inner ends of the wire spoke members 12. These holes 18 preferably extend inwardly from the hub surface a considerable depth to accommodate a sufficient portion of the spoke members 12 for providing the necessary lateral support therefor.

Prior to the assembling operation, the surfaces of the hub and spoke members are highly polished. This can be easily and quickly accomplished at a minimum cost while the members are separate.

In the preferred method of assembling this steering wheel, the spoke members 12 are first inserted into the holes 18, then, by means of a jig or other similar gauging device, the outer ends of the spokes are held in a position to facilitate joining them to the rim 10 of the steering wheel in some convenient manner, such, for example, as disclosed in my prior application Serial No. 52,158, filed November 29, 1935.

While the rim is thus held centrally with respect to the hub with the spoke members extending into the holes 18, an annular groove, as indicated at 20, is milled or machined from the top face 22 of the hub member to a depth sufficient to cut in each spoke member 12, a shallow notch, as at 24. Thus the walls of the groove in the hub and the surfaces of the notches in the spoke members are absolutely flush and define continuous wall surfaces, respectively. This machine operation may be accomplished by a rotary mill cutter placed in a drill press or other similar machine.

When the groove is positioned as shown in Fig. 2, provision for the escape of metal shavings during the milling operation must be made. For this purpose, I have provided a number of circumferentially spaced and inclined troughs 26 which open into the cylindrical recess 16. The troughs 26 are preferably cast in the hub.

To prevent the removal of the spoke members 12 from the hub 14, a suitable spoke locking ring or key 28 is pressed snugly into the groove 20 so that the bottom portion of the ring seats firmly in each and every one of the notches 24. The ring 28 is secured in this position, preferably by providing on an upper corner of the ring 28 a beveled portion 29, and peening over a shoulder portion 30 of the hub adjacent the groove so that it firmly abuts the beveled surface 29 and holds the ring 28 permanently in place. The peening operation drives the ring downwardly and securely seats and locks it in the groove 20 and notches 24. When the ring 28 is thus firmly seated, it not only locks the spoke members 12 against axial displacement, but also against lateral weaving and twisting about their respective axes.

For purposes of illustration, the groove 20 has been shown as lying between the inner and outer radial limits of the portion 14 of the upper face of the hub, though in some instances, this positioning is unnecessary. For example, the ring may be pressed over the hub and engage the outer periphery of the hub itself, or the locking ring may be pressed into the central recess 16. In the latter instance, the groove portion in the hub itself receiving the locking ring would, of course, have only one, or perhaps two, bounding walls, but the word "groove", as used herein, is meant to include this broader concept.

In addition to the methods of accomplishing this spoke anchoring arrangement, the disclosure will suggest, to those skilled in the art, other modifications thereof that are equally effective, such as machining a plurality of slots in the upper face of the hub of which each slot extends transversely of a given set of spoke members and to a depth sufficient to cut notches therein. In such instances, rectangular keys may be inserted in the slots and notches.

It is readily apparent from the foregoing description and the drawings, that this method of securing the spokes to the hub is very effective as an anchor and can be accomplished economically and with great speed which is consistent with the above set forth objects.

Having thus described my invention, what I claim is:

1. In a steering wheel comprising a plurality of angularly spaced groups of wire spoke members and a unitary hub, said hub having a plurality of substantially radially directed spoke receiving passages, spokes received in the passages, and means for connecting the spoke members to the hub in said passages, comprising mutually flush surfaces formed in the hub and in each of the wire spoke members, said surfaces of the hub continuing from one group of spokes to another group, said surfaces being at an angle to the longitudinal direction of each wire spoke member, and a rigid spoke retaining means abutting both the hub and each wire spoke member of a plurality of groups of spoke members at the mutually flush surfaces and bridging from one wire spoke member to another whereby to securely anchor each spoke member to the hub.

2. A steering wheel comprising a unitary hub and a plurality of groups of wire spoke members having portions lying partially within the hub and the remainder projecting substantially radially therefrom, said hub having an annular surface and the spoke members having notches therein flush with said annular surface, a rigid ring mutually engaging the annular surface of the hub and the notches of the spoke members for positively anchoring each of the spoke members to the hub.

3. An automobile steering wheel including a unitary hub, and a plurality of wire spoke members, said hub having upper and lower end faces and a plurality of substantially radial openings in the sides, each of said openings snugly receiving and supporting one end portion of one wire spoke member, said openings being positioned intermediate the upper and lower end faces, a groove formed in one of the end faces and extending to a depth sufficient to provide a notch in the end portions of each of the wire spoke members, and a key in the groove lying in the notch.

4. An automobile steering wheel including a unitary hub, and a plurality of wire spoke members, said hub having upper and lower end faces and a plurality of substantially radial openings in the sides, each of said openings snugly receiving and supporting one end portion of one wire spoke member, said openings being positioned intermediate the upper and lower end faces, a groove formed in one of the end faces and extending to a depth sufficient to provide a notch in the end portions of each of the wire spoke members, and a key in the groove lying in the notch, and means for retaining the key in the groove.

5. An automobile steering wheel including a unitary hub and a plurality of groups of wire spoke members, said hub having an axially extending annular portion, the outer peripheral wall of said annular portion having a plurality of groups of substantially radial wire spoke receiving bores, the inner end portion of each wire spoke member being received in the associated one of said bores, an annular groove in the end face of the annular portion and disposed coaxially with the said annular portion, said groove extending partially into the cross section of each of said wire spoke members and terminating endwise of the said annular portion, the bottom portion of said groove being partially defined by the partial cross section of each wire spoke member, and an annular key in the groove which engages the partial cross section of each wire spoke member to securely lock each spoke member to the hub.

6. An automobile steering wheel including a unitary hub, and a plurality of wire spoke members, said hub having upper and lower end faces and a plurality of substantially radial openings in the sides, each of said openings snugly receiving and supporting one end portion of one wire spoke member, said openings being positioned intermediate the upper and lower end faces, a groove formed in one of the end faces and extending to a depth sufficient to provide a notch in the end portions of each of the wire spoke members, and a key in the groove engaging the walls of each of the notches, said key having a beveled portion in the end adjacent said one of the end faces, whereby the wall of the groove can be peened against the beveled portion to firmly hold the key in position within the groove and notches.

HARRY A. HUSTED.